March 20, 1928.
W. H. ROSE
1,663,480
CONTAINER CLOSURE
Filed April 22, 1927
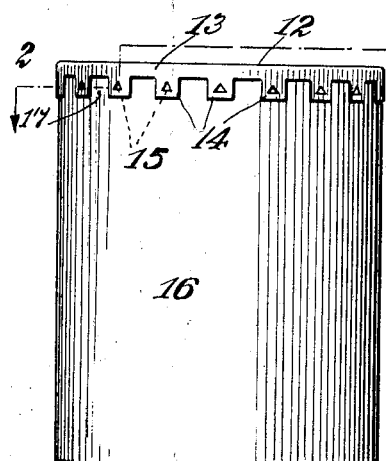
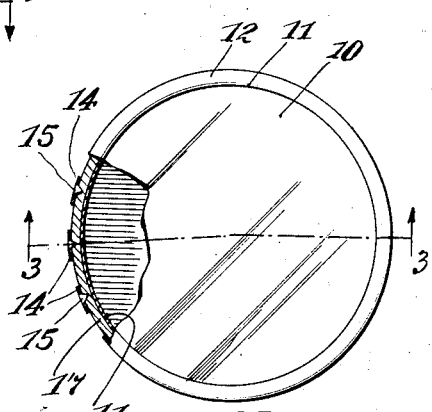
Fig.1. Fig.2.
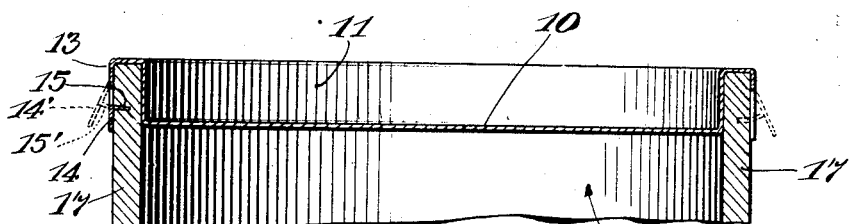
Fig.3.
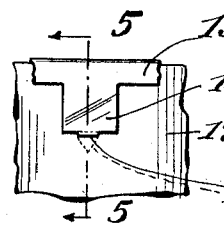 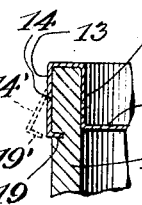 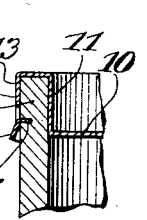
Fig.4. Fig.5. Fig.6. Fig.7.
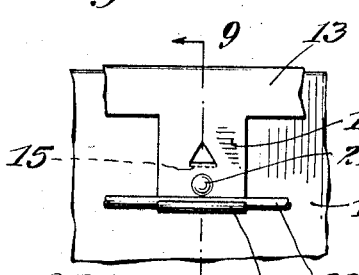 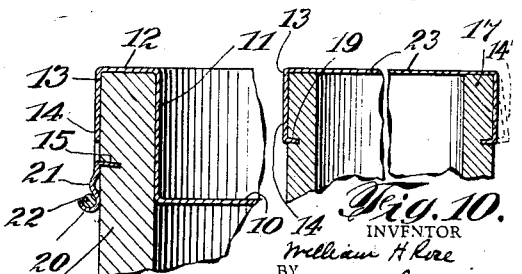
Fig.8. Fig.9. Fig.10.
INVENTOR
William H. Rose
BY
Howard Freeman
his ATTORNEY Patented Mar. 20, 1928.

1,663,480

UNITED STATES PATENT OFFICE.

WILLIAM H. ROSE, OF JERSEY CITY, NEW JERSEY.

CONTAINER CLOSURE.

Application filed April 22, 1927. Serial No. 185,791.

My invention relates to container closures and refers particularly to closures suitable for use with containers made of paper, cardboard, fiber, wood and similar composition.

One of the objects of my invention is a device capable of being applied to a container by means of prongs in such a manner that a practically complete closure will be accomplished by means of a plurality of prongs carried by the device.

Another object of my invention is a pronged device in which the prongs may be individually or in unison inserted within the side of a container forming a tight closure, the prongs being capable of removal and the device removed without destroying the container.

The above mentioned, and other valuable, attributes of my device will be evident upon a consideration of this specification and its accompanying drawings.

One of the features of my device is the ease with which it may be effectively employed as a closure.

The operations of adaptation to a container consist in placing it over the open end of the container, and pressing a plurality of tongues each carrying a prong, such pressure causing the prongs to enter the side of the container and retaining the closure upon the container.

These prongs may be inserted individually by pressing upon the individual tongues, or they all may be inserted at once by forcing a band, or ring, downwardly over the angularly positioned tongues, thus forcing all of the prongs into the container side simultaneously, and in the latter operation the band, or ring, acts as a means for maintaining the prongs in their inserted positions.

It is frequently desirable to remove a container closure without destroying the container in order to obtain access to the contents and to allow of the replacement of the closure. This is readily accomplished in my device by withdrawing the prongs from insertion within the container wall, which allows of the removal of the closure and its replacement into closure position when desired.

While I have described herein certain definite forms of my device, it is evident that changes may be made within the scope of my invention.

In the accompanying drawings showing modified forms of the device of my invention similar parts are designated by similar numerals.

Figure 1 is a side view of one form of my device attached to a container.

Figure 2 is a cross-section through the line 2—2 of Figure 1.

Figure 3 is an enlarged cross-section through line 3—3 of Figure 2.

Figure 4 is a fragmental side view of a modified form of the device of my invention.

Figure 5 is a cross-section through the line 5—5 of Figure 4.

Figure 6 is a fragmental side view of the modified form of the device of my invention.

Figure 7 is a cross-section through the line 7—7 of Figure 6.

Figure 8 is a fragmental side view of a modified form of the device of my invention.

Figure 9 is a cross-section through the line 9—9 of Figure 8.

Figure 10 is a fragmental vertical cross-section of a modified form of my device.

The particular form of the device of my invention shown in Figures 1 to 3, inclusive, comprises an annular metallic closure cover having a central portion 10, the outer portion of which is bent upwardly at 11, transversely at 12 and downwardly at 13. The outer flange portion 13 has a plurality of integral extended tongues 14, 14, in each of which a pointed prong 15 has been formed by stamping, or cutting, the two sides thereof and inwardly bending the thus produced pointed prong.

In operation the device is placed across the upper opening of the container 16, the device then being in the position shown in Figure 3, the tongue 14′ and its prong 15′ being in the position shown in dotted lines, thus allowing the introduction of the upper portion of the side 17 of the container 16 to be inserted within the U-shaped recess formed by the members 11, 12, and 13. The tongues 14, 14 are then pressed inwardly, causing the prongs 15, 15 to enter the container wall 17. It will be noted, that a tight jointure is thus formed between the closure and the container wall, the closure being maintained in position by the prongs 15, 15.

To remove the closure, the tongues 14, 14, are bent outwardly by any suitable means and in Figures 6 and 7, I illustrate a form of tongue which allows of this withdrawal.

In this tongue construction, the lower portion 18 of the tongue is bowed outwardly thus allowing the insertion of a suitable instrument between the tongue and the container wall.

In the modified form of the device of my invention shown in Figures 5 and 6, each tongue 14 has an extended integral prong 19, capable of being bent inwardly for purposes of insertion within the container wall 17.

In Figures 8 and 9, I show a means for clamping the prongs within the container walls, which is particularly adaptable in these cases in which the device is made of thin metal. In this construction, each tongue is recessed at the lower extremity 20 by rolling, or bending, the tongue outwardly and upwardly. A lug 21 is formed by pressing the tongue metal outwardly at that point. A wire ring 22 placed around the device rests within the tongue recess and is prevented from upper movement by the lugs 21, 21. The wire ring 22 may be made of the proper size and forced downwardly into position, or a wire may be drawn around the device and the ends fastened together by any suitable means. It will be noted that if the closed ring, or band, is forced downwardly, it will cause all of the prongs to enter the container side simultaneously.

In Figure 10 I illustrate a form of my device in which the central member 23, extends over, and abuts upon, the upper edge of the side 17 and carries the tongues 14, 14 each having an extended prong 19.

It will be noted from the above that my device provides an inexpensive and effective means for closing a container, that is easily attached, that the attachment is of a firm character and that the closure thus formed is dust proof.

I do not limit myself to the particular size, shape, number, arrangement or material of parts as shown and described as these are given simply as a means for clearly describing my invention.

What I claim is:

1. In a container closure, in combination, a central member, a flange carried by the central member, a plurality of downwardly extended tongues carried by the outer portion of the flange, a prong extending inwardly from each tongue and a closed ring capable of downward movement over the said tongues such movement forcing the tongues into the sides of a receptacle upon which the device is placed.

2. In a container closure, in combination, a central member, a U-shaped flange carried by the central member, a plurality of downwardly extended tongues carried by the outer portion of the flange, a prong extending inwardly from each tongue and a closed ring capable of downward movement over the tongues such movement forcing the tongues into the sides of a receptacle upon which the device is placed.

3. In a container closure, in combination, a central member, a flange carried by the central member, a plurality of downwardly extended tongues carried by the outer portion of the flange, a prong extending inwardly from each tongue, an outwardly extended lug carried by each tongue and a closed ring capable of downward movement over the said tongues such movement forcing the tongues into the sides of a receptacle upon which the device is placed.

4. In a container closure, in combination, a central member, a U-shaped flange carried by the central member, a plurality of downwardly extended tongues carried by the outer portion of the flange, a prong extending inwardly from each tongue, an outwardly extended lug carried by each tongue and a closed ring capable of downward movement over the said tongues such movement forcing the tongues into the sides of a receptacle upon which the device is placed.

5. In a container closure, in combination, a central member, a flange carried by the central member, a plurality of downwardly extended tongues carried by the outer portion of the flange and having their lower edges rolled outwardly and upwardly, a prong extending inwardly from each tongue and a closed ring capable of downward movement over the said tongues such movement forcing the tongues into the sides of a receptacle upon which the device is placed.

6. In a container closure, in combination, a central member, a U-shaped flange carried by the central member, a plurality of downwardly extended tongues carried by the outer portion of the flange and having their lower edges rolled outwardly and upwardly, a prong extending inwardly from each tongue and a closed ring capable of downward movement over the said tongues such movement forcing the tongues into the sides of a receptacle upon which the device is placed.

Signed at New York city in the county of New York and State of New York this 19th day of April, 1927.

WILLIAM H. ROSE.